United States Patent [19]

McLean

[11] Patent Number: 4,499,711
[45] Date of Patent: Feb. 19, 1985

[54] DEFLECTOR PANEL FOR DISC MOWER-CONDITIONER

[75] Inventor: Kenneth W. McLean, New Holland, Pa.

[73] Assignee: Sperry Corporation, New Holland, Pa.

[21] Appl. No.: 585,674

[22] Filed: Mar. 2, 1984

[51] Int. Cl.³ ............................................. A01D 35/26
[52] U.S. Cl. ..................................... 56/13.6; 56/16.4; 56/180; 56/DIG. 1
[58] Field of Search ................... 56/13.6, 16.4, 180, 56/DIG. 1, 192

[56] References Cited

U.S. PATENT DOCUMENTS 4,177,625 12/1979 Knight et al. .................. 56/DIG. 1

*Primary Examiner*—Jay N. Eskovitz
*Attorney, Agent, or Firm*—Larry W. Miller; Frank A. Seemar; Darrell F. Marquette

[57] ABSTRACT

A disc mower-conditioner having a disc cutterbar provided with transversely spaced rotatable cutter units operable to sever standing crop material by impact action and a flexible curtain extending around the perimeter of the disc cutterbar is disclosed wherein a transverse deflector panel is supported by the mower-conditioner frame between the disc cutterbar and the flexible curtain to restrict the movement of the forward transverse portion of the flexible curtain toward the cutterbar. The deflector panel is pivotally mounted for fore-and-aft movement about a generally transverse axis and has sufficient mass to resist movement of the curtain induced by an air flow created by rotation of the disc cutters. The deflector panel includes a lower curved portion to facilitate the passage of crop material therebeneath for presentation to the disc cutterbar.

14 Claims, 4 Drawing Figures

DEFLECTOR PANEL FOR DISC MOWER-CONDITIONER

BACKGROUND OF THE INVENTION

The present invention relates generally to hay harvesting machines, commonly referred to as mower-conditioners, and, more particularly, to a deflector panel for a disc mower-conditioner to restrict movement of the flexible curtain toward the disc cutterbar.

A disc mower-conditioner is provided with a disc cutterbar having a number of transversely spaced rotatable cutter members operable to sever standing crop material by an impact action. A conditioning mechanism mounted rearwardly of the disc cutterbar is operable to receive and condition severed crop material without depositing the severed crop upon the ground before it is conditioned. Generally, a disc cutterbar is provided with a flexible curtain extending around the perimeter of the disc cutterbar to permit an unhindered flow of standing crop material to the disc cutterbar, yet restrain the passage of foreign objects outwardly from the disc cutterbar.

It has been found that under certain conditions, such as the encounter of areas of light crop, the air turbulence created by the rotating disc cutter members and/or the rotating conditioning mechanism can effect a movement of the flexible curtain toward the disc cutterbar to an undesirable position. Accordingly, it would be desirable to restrict the movement of the flexible curtain toward the disc cutterbar.

SUMMARY OF THE INVENTION

It is an object of the invention to overcome the aforementioned disadvantages of the prior art by providing a transverse deflector panel on a disc mower-conditioner to restrict the movement of the flexible curtain toward the disc cutterbar.

It is another object of this invention to provide a deflector panel construction that will restrict movement of the flexible curtain without hindering the flow of crop material toward the disc cutterbar.

It is a feature of this invention that the deflector panel has sufficient mass to restrict movements of the flexible curtain caused by the turbulent air flow from the operation of the disc mower-conditioner.

It is an advantage of this invention that the flexible curtain is prevented from moving to an undesirable position toward the disc cutterbar.

It is another feature of this invention that the deflector panel is hingedly mounted to permit movement thereof in a fore-and-aft direction.

It is yet another feature of this invention that the flexible curtain extends closer to the ground than the adjacent deflector panel.

It is still another object of this invention to impede the passage of foreign objects thrown by the disc cutter members in a generally forward direction.

It is a further object of this invention to provide a deflector panel to restrict the movement of the flexible curtain of a disc mower-conditioner toward the disc cutterbar that is durable in construction, inexpensive of manufacture, carefree of maintenance, facile in assemblage and simple and effective in use.

These and other objects, features and advantages are accomplished according to the instant invention by providing a disc mower-conditioner having a disc cutterbar provided with transversely spaced rotatable cutter units operable to sever standing crop material by impact action and a flexible curtain extending around the perimeter of the disc cutterbar, wherein a transverse deflector panel is supported by the mower-conditioner frame between the disc cutterbar and the flexible curtain to restrict the movement of the forward transverse portion of the flexible curtain toward the cutterbar. The deflector panel is pivotally mounted for fore-and-aft movement about a generally transverse axis and has sufficient mass to resist movement of the curtain induced by an air flow created by rotation of the disc cutters. The deflector panel includes a lower curved portion to facilitate the passage of crop material therebeneath for presentation to the disc cutterbar.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
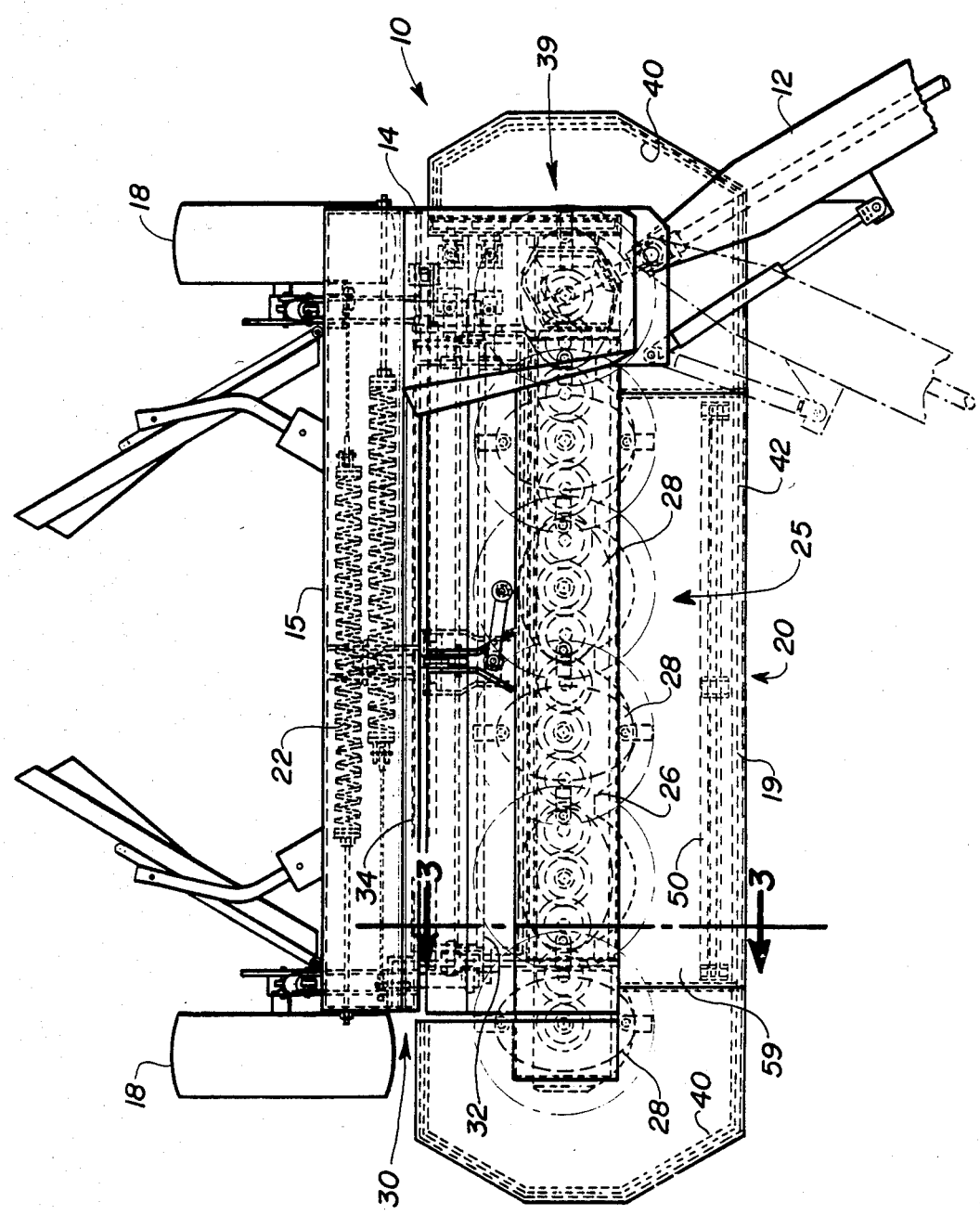
FIG. 1 is a top plan view of a disc mower-conditioner incorporating the principles of the instant invention, a portion of a draft member being broken away.

Referring now to the drawings and, particularly, to FIG. 1, a top plan view of a hay harvesting machine, commonly referred to as a disc mower-conditioner, can be seen. Left and right references are used as a matter of convenience and determined by standing at the rear of the mower-conditioner, facing the forward end, the direction of travel. The mower-conditioner 10 is shown in the form of a pull-type machine having a draft member 12 pivotally connected to the frame 14 of the machine 10. The frame 14 includes a main transverse support beam 15 to which are connected downwardly depending legs 17 mounting wheels 18 for mobilely supporting the machine 10 over the ground G, as best seen in FIG. 2.

Figure 2:
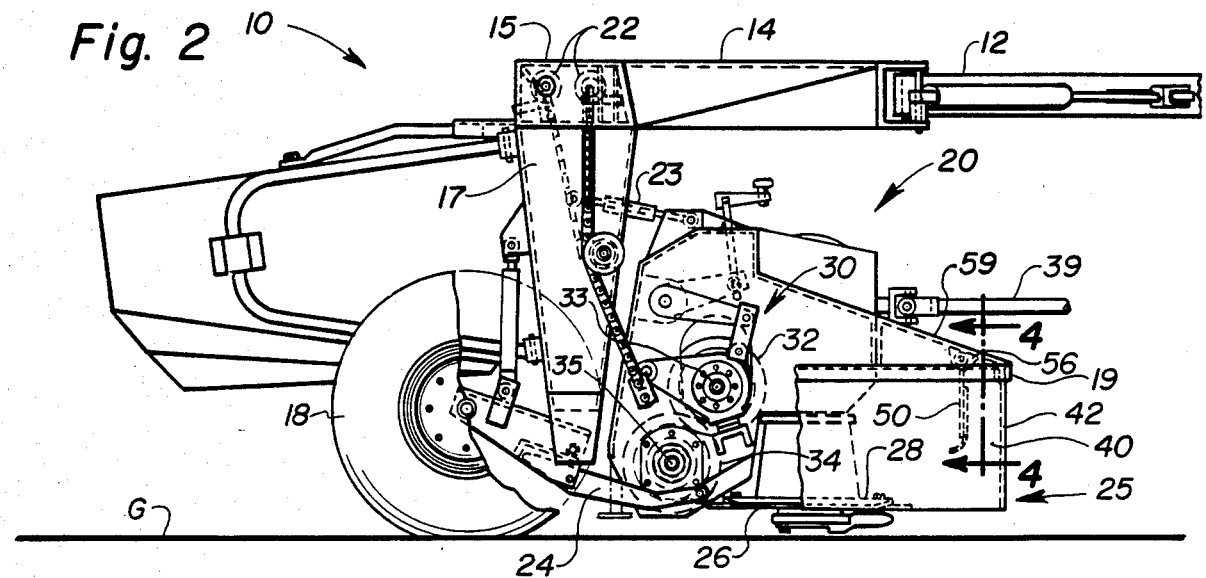
FIG. 2 is a side elevational view of a disc mower-conditioner seen in FIG. 1 which portions being broken away to better show the invention.

Referring to FIGS. 1 and 2, the mower-conditioner 10 includes a crop harvesting header 20 floatingly supported for movement over the ground G relative to the frame 14 by the counterbalancing mechanism 22 and upper and lower links 23,24 interconnecting the header 20 and the frame 14. The header 20 is provided with a crop cutting mechanism 25, seen in the form of a disc cutterbar 26, such as a Kuhn three meter, six rotor rotary cutterbar, having a plurality of transversely spaced disc cutter members 28 operable to sever standing crop material by an impact action and housing drive transmission means 27 for effecting rotation of cutter units 28. A conditioning member 30 is mounted in the header 20 rearwardly of the cutting mechanism 25, to receive and condition crop material severed by the cutterbar 26.

The conditioning mechanism 30 includes a pair of cooperable, generally vertically spaced transverse conditioning rolls 32,34 operable to condition severed crop passing therebetween. Each roll 32,34 is rotatably mounted such that the axis of rotation 33 of the upper conditioner roll 32 is spaced slightly forwardly of the axis of rotation 35 of the lower conditioning roll 34 so that the nip 37 formed therebetween is facing slightly downwardly toward the disc cutterbar 26. The preferred embodiment of the conditioning roll construction shown in FIGS. 1 and 2 is of the intermeshing lug design. A drive mechanism 39 provides rotational power to the cutter units 28 via the drive transmission means 27 and the conditioning mechanism 30 in a conventional manner.

Figure 3:
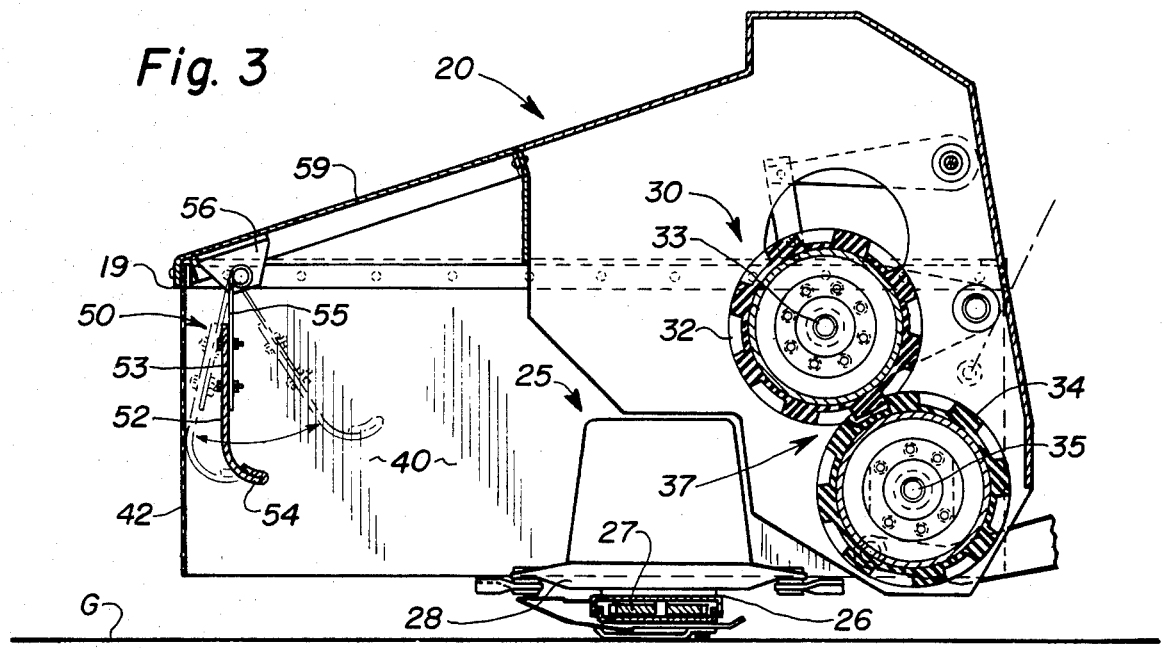
FIG. 3 is an enlarged partial cross-sectional view of the disc mower-conditioner taken along lines 3—3 of FIG. 1, the fore-and-aft movement of the deflector panel being shown in phantom.

Referring now to FIGS. 1-3, the disc mower-conditioner 10 is provided with a flexible curtain 40 supported from a subframe member 19 and extending around the sides and front perimeter of the disc cutterbar 26. The flexible curtain 40 is operable to impede the passage of foreign objects impacted by the disc cutterbar 26 and thrown outwardly by the disc cutter units 38. The flexible curtain 40 includes a transverse portion 42 spaced forwardly of the disc cutterbar 26. The transverse portion 42 of the flexible curtain 40 extends downwardly from the subframe member 19 to approximately the cutting plane of the disc cutter units 28 and is positioned so as to not hinder the flow of standing crop material presented to the cutting mechanism 25.

Figure 4:
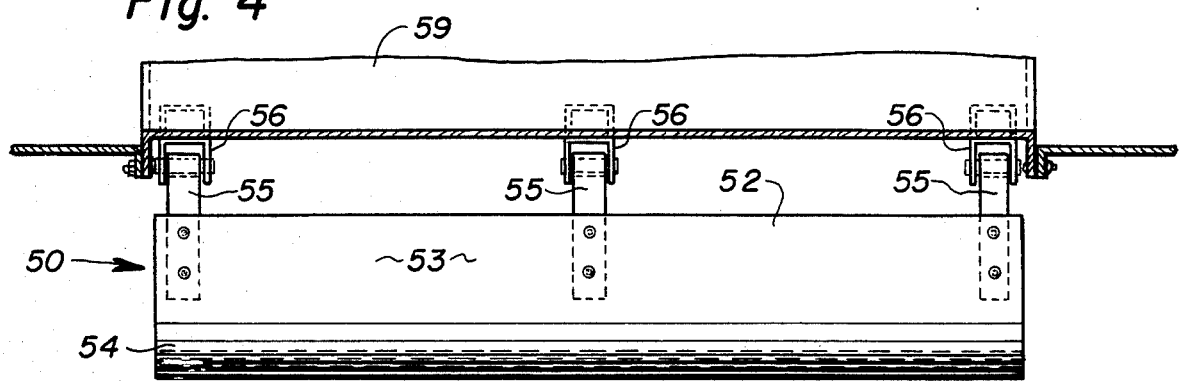
FIG. 4 is a partial cross-sectional view corresponding to lines 4—4 of FIG. 2 and showing a front elevational view of the deflector panel.

It is possible that the air flow created by the rotation of the individual disc cutter members 28 and the conditioning rolls 32,34 will effect a movement of the flexible curtain 40, particularly the transverse portion 42, toward the disc cutterbar 26. To restrict this movement of the transverse portion 42 of the curtain 40, a deflector panel 50 is supported by the subframe member 19 between the disc cutterbar 26 and the transverse portion 42, adjacent the flexible curtain 40. As is best seen in FIGS. 3 and 4, the deflector panel 50 comprises a transverse deflecting member 52 detachably connected to a plurality of transversely spaced hinge members 55. Each hinge member 55 is pivotally connected to support brackets 56 affixed to the subframe member 19 so as to permit a generally pivotal movement of the deflector panel 50 in a fore-and-aft direction, as shown in phantom in FIG. 3.

The deflecting member 52 includes an upper portion 53 detachably connected to the hinge members 55 and a curved lower portion 54 depending downwardly below the hinge members 55. As best seen in FIG. 3, the curved lower portion 54 does not extend downwardly toward the ground G as far as the transverse portion 42 of the flexible curtain 40. The curved portion 54 curves inwardly toward the disc cutterbar 26 to facilitate the flow of crop material past the deflector panel 50 to the disc cutter units 28. A hood member 59 is formed as part of the subframe 19 and extends rearwardly from the transverse portion 42 of the curtain 40 over the disc cutterbar 26 to the transverse beam 15. The support brackets 56 are affixed to the hood member 59 adjacent the transverse portion 42.

In operation, the disc mower-conditioner 10 is pulled by a prime mover (not shown) over a field of crop material, such as hay. The standing crop material is swept underneath the transverse portion 42 of the flexible curtain 40 and the deflector panel 50 for presentation to the disc cutterbar 26 so that the disc cutter units 28 can sever the standing crop material. The curved lower portion 54 of the deflecting member 52 and the permissible fore-and-aft pivotal movement of the deflector panel 50 facilitates the passage of standing crop material beneath the deflector panel 50. The deflector panel 50 has sufficient mass to resist any movement of the transverse portion 42 of the flexible curtain 40 toward the cutting mechanism 25 induced by air currents created by the rotation of the individual disc cutter units 28 and the conditioning rolls 32,34. Accordingly, the provision of the deflector panel 50 helps maintain the integrity of the positioning of the flexible curtain 40 around the perimeter of the disc cutterbar 26.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific forms shown.

Having thus described the invention, what is claimed is:

1. In a rotary mowing mechanism adapted for movement in a forward direction over the ground and having a transverse cutterbar mounting transversely spaced rotatable cutter units having knives connected thereto to sever standing crop by impact therewith upon rotation of said cutter units, said cutterbar housing drive transmission means operably connected with said cutter units to transfer rotational power thereto; a flexible curtain supported from a frame member and extending around the front and transverse sides of said cutterbar, said curtain including a transversely extending portion spaced forwardly of said cutterbar; and drive means operably connected to said drive transmission means to deliver rotational power thereto, the improvement comprising:

a transverse deflector supported from said frame member between the transverse portion of said curtain and said cutterbar to restrict the movement of the transverse portion of said curtain toward said cutterbar.

2. The rotary mowing mechanism of claim 1 wherein said deflector is pivotally mounted for fore-and-aft movement about a generally transverse axis.

3. The rotary mowing mechanism of claim 2 wherein said deflector has sufficient mass to resist movement of said curtain toward said cutterbar induced by an air flow caused by rotation of said cutter units.

4. The rotary mowing mechanism of claim 3 wherein said deflector includes a transverse deflecting member detachably connected to a plurality of transversely spaced hinge members.

5. The rotary mowing mechanism of claim 4 wherein said hinge members are pivotally connected to brackets supported by said frame member.

6. The rotary mowing mechanism of claim 4 wherein said deflecting member is generally vertically disposed with an upper portion connected to said hinge members and a curved lower portion extending inwardly toward said cutterbar to facilitate the passage of crop material toward said cutterbar.

7. The rotary mowing mechanism of claim 6 wherein the transverse portion of said curtain extends downwardly from said frame member closer to the ground than said lower portion of said deflecting member.

8. The rotary mowing mechanism of claim 7 further including conditioning means mounted rearwardly of said cutterbar to condition crop material severed by said cutter units.

9. A disc mower-conditioner having a mobile frame adapted for movement over the ground in a forward direction; rotary cutting means supported by said frame adjacent the ground to sever standing crop material, said rotary cutting means having a transverse cutterbar rotatably mounting a plurality of transversely spaced cutter units, each cutter unit having at least one knife for severing standing crop material upon rotation of said cutter units; conditioning means rotatably supported by said frame generally rearwardly of said rotary cutting means to condition crop material severed by said cutter units; a flexible curtain supported by a frame member and extending around the front and transverse sides of said rotary cutting means, said curtain including a transverse portion spaced forwardly of said rotary cutting means, the improvement comprising:

a transverse deflector supported from said frame member between the transverse portion of said curtain and said rotary cutting means, said deflector having sufficient mass to restrict the movement of said transverse portion of said curtain induced by air currents caused by the rotational movement of said rotary cutting means and said conditioning means toward said rotary cutting means.

10. The disc mower-conditioner of claim 9 wherein said deflector is pivotally mounted for fore-and-aft movement about a generally transaverse axis.

11. The disc mower-conditioner of claim 10 wherein said deflector includes a transverse deflecting member connected to a plurality of transversely spaced hinge members.

12. The disc mower-conditioner of claim 11 wherein said frame member supports a hood extending rearwardly from said transverse portion of said curtain.

13. The disc mower-conditioner of claim 12 wherein said hinge members are pivotally connected to brackets affixed to said hood.

14. The disc mower-conditioner of claim 12 wherein said deflecting member is generally vertically disposed and includes a lower portion curved inwardly toward said rotary cutting means to facilitate the passage of crop material past said deflector toward said rotary cutting means.

* * * * *